United States Patent [19]
Nakatsuyama

[11] Patent Number: 5,875,441
[45] Date of Patent: Feb. 23, 1999

[54] DOCUMENT DATABASE MANAGEMENT SYSTEM AND DOCUMENT DATABASE RETRIEVING METHOD

[75] Inventor: Hisashi Nakatsuyama, Nakai-machi, Japan

[73] Assignee: Fuji Xerox Co., Ltd., Tokyo, Japan

[21] Appl. No.: 851,892

[22] Filed: May 6, 1997

[30] Foreign Application Priority Data

May 7, 1996 [JP] Japan .................................. 8-112301

[51] Int. Cl.[6] .................................................. G06F 17/30
[52] U.S. Cl. ...................... 707/1; 707/2; 707/3; 707/4; 707/5; 707/104; 707/513; 707/516; 707/532; 395/500
[58] Field of Search .................................. 707/1, 2, 3, 4, 707/10, 9, 5, 101, 102, 506, 6, 513, 514, 200, 104, 532, 501, 500, 900, 907, 100, 103, 902; 1/1; 395/200.36, 200.33, 683, 710, 500, 200.48

[56] References Cited

U.S. PATENT DOCUMENTS

| | | | |
|---|---|---|---|
| 5,649,218 | 7/1997 | Saito | 707/513 |
| 5,708,806 | 1/1998 | DeRose et al. | 707/104 |
| 5,727,195 | 3/1998 | Nakatsuyama | 707/1 |
| 5,745,745 | 4/1998 | Tada et al. | 395/601 |
| 5,752,021 | 5/1998 | Nakatsuyama et al. | 395/605 |

FOREIGN PATENT DOCUMENTS

| | | |
|---|---|---|
| 0620527A2 | 10/1994 | European Pat. Off. . |
| 0747836A1 | 12/1996 | European Pat. Off. . |
| A-7-44579 | 2/1995 | Japan . |

*Primary Examiner*—Wayne Amsbury
*Assistant Examiner*—Srirama Channavajjala
*Attorney, Agent, or Firm*—Oliff & Berridge, PLC

[57] ABSTRACT

This invention provides a document database management system that reduces time to retrieve a structured document and improves precision of a result of the retrieving. Query input unit inputs a query including structural elements and a relationship between them. Document type retriever retrieves at least one document type that matches to the structural elements and the relationships between them included in the inputted query. Document type display displays the at least one retrieved document type on the screen of the display device. Document type input unit selects a document type from the at least one document type displayed on the screen. Document retriever retrieves a document satisfying the inputted query from prospective documents, each of which is created according to the document type inputted by the document type input unit.

19 Claims, 12 Drawing Sheets

| STARTING ELEMENT | ADJACENT ELEMENTS | REACHABLE ELEMENTS |
|---|---|---|
| ARTICLE | SECTION | SECTION, TITLE, PARAGRAPH |
| SECTION | TITLE, PARAGRAPH, SECTION | SECTION, TITLE, PARAGRAPH |
| TITLE | ∅ | ∅ |
| PARAGRAPH | ∅ | ∅ |

DOCUMENT DATABASE MANAGEMENT SYSTEM AND DOCUMENT DATABASE RETRIEVING METHOD

BACKGROUND OF THE INVENTION

1. Field of the Invention

This invention relates to a document database management system that retrieves a structured document from a document database that stores structured documents, and a document database retrieving method for retrieving a document from a document database that stores structured documents. More specifically, this invention relates to a document database management system which manages plural structured documents that are created according to a variety of document types, and a document database retrieval method for retrieving a structured document from plural structured documents that are created according to a variety of document types.

2. Description of the Related Art

A structured document is a document having a logical structure, which is represented as a tree structure comprising structural elements, such as a chapter, a section and a figure. Standardizing logical structures make it easier to share documents and to process document structure.

FIG. 12 shows an example of the logical structure of a structured document. This figure includes an element 31 whose element type is "article" at the top, i.e., the root of the tree, and two elements 32 and 33 whose element type is "section" as children of the root. The element 32 has three children: an element 34 whose element type is "title", an element 35 whose element type is "paragraph" and an element 36 whose element type is "section". The element 33 has three children: an element 37 whose element type is "title" and two elements 38 and 39 whose document type is "paragraph". The element 36 has three children, which are an element 40 whose element type is "title" and two elements 41 and 42 whose element type is "paragraph".

In the typical structured document models, the logical structure is created according to a syntactic rule referred to as a document type. Structured documents have an advantage of ease in document processing, since it is defined by predetermined structural rules. A structured document is simply referred to as "document" hereinafter.

FIG. 13 shows a syntactic rule to which the logical structure of FIG. 12 conforms. In this figure, a square node defines a type of element (element type) and a label of the node indicates a name of the element type. Nodes having the same name are identical An oval node defines a relationship between elements. This node is referred to as a constructor. There are four constructors comprising "SEQ", "REP", "OPT" and "CHO". The constructor "SEQ" means that instances of the nodes appearing under it should be created in this order. An "instance" of an element type is an element in a document that is created according to the element type. The constructor "REP" means that an instance of a node following thereto is created repeatedly. The constructor "OPT" means that an instance of a node following thereto is not always required to be included in a document. The constructor "CHO" means that an instance of an element node following thereto is always created.

In this figure, the node 51 defining an element type "article" is a root node, the node 52 is a constructor "REP", the node 53 defines an element type "section", the node 54 is a constructor "SEQ", the node 55 defines an element type "title", both nodes 56 and 59 are constructors "OPT", both nodes 57 and 60 are constructors "REP", the node 58 defines an element type "section" and the node 61 defines an element type "paragraph" respectively. These nodes are arrange and connected in their numerical order.

FIG. 13 includes two nodes 53 and 58 whose element type is "section". This means that the element type "section" is defined recursively.

A document database management system managing structured documents stores many documents that are created according to a variety of document types. The document database management system provides a query language that allows users to describe queries to retrieve required documents from the document database. Typically, there are two types of query languages: the one is described in a textual form, and the other is graphically described by using a graphical user interface.

FIG. 14 is an example of a query described graphically. A query for retrieving structured documents can include a condition regarding a structure of a document comprising element types and a relationship therebetween. In the query, each node corresponds to an element of a structured document, and a string in a node indicates an element type thereof. Nodes are connected by an arc each other. An arc drawn by a solid line represents parent-child relationship between elements corresponding to nodes at the both ends of the arc. An arc drawn by a dashed line represents ancestor-descendant relationship between elements corresponding to the nodes at the both ends of the arc. A "parent-child relationship" means that a node in a tree is immediately subordinate to another. An "ancestor-descendant relationship" means that a node in a tree is subordinate to another. Thus, the "ancestor-descendant relationship" includes the "parent-child relationship". The query for retrieving structured documents also can include a condition regarding contents of a document. A string under a node in FIG. 14 indicates that the string should be included in a text held by an element of the node.

Plural arcs come from a node in a query mean that the retrieving result should satisfy all the conditions defined by relationships between nodes. Thus, the query is conjunctive. In this example, a node 71 whose element type is "section" is the root node. A node 72 whose element type is "title" is a child of the node 71, and the node 72 includes a string "document". A node 73 whose element type is "paragraph" is a descendant of the node 71, and the node 73 includes a string "database". This is briefly explained that this query designates instances of "section" each of which has both at least one title including a string "document" as its child and at least one paragraph including a string "database" as its descendant. Here, a "child" means a node immediately subordinate to another in a tree. A "descendant" means a node immediately subordinate to another in a tree. Thus, a child of a node is also a descendant of the node.

Structured documents can be retrieved by using such a query. The query may include an author of a document, a date of creation, a security level, or the like, as retrieving conditions as well.

There are two database management methods: one defines a schema for each document type (referred to as a first conventional system hereinafter) and another defines a unique schema representing an arbitrary logical structure (referred to as a second conventional system hereinafter).

The first conventional system is a common system in a general-purpose database management system such as a relational database management system or an objectoriented database management system. In a database management system using this method, the document type of documents to be retrieved is designated for retrieval, and documents that conform to the schema of the document type are searched.

The second conventional system is, for example, disclosed in the Japanese Unexamined patent publication No.7-44579. Since this method has only one schema, all documents stored in the database system will be prospective documents to be retrieved. Accordingly, even if there are more than one document type for the documents in the database, all stored documents are searched simultaneously.

Document types are very often altered or improved as time lapsed. If there is a long time lag between the time a document type is designed and the time documents are created according to the document type, the document type should be altered according to the change of the requirement to the document type. Document types that are occasionally altered in such a way are used for the same purpose, but structural restrictions of the document types are different from each other.

For instance, when a document type is designed, the following steps are repeatedly executed. It is checked whether a logical structure that the document type specify satisfies requirements to the document type or not. If it does not satisfy the requirements, it is corrected to satisfy the requirement. Thus, the definition of the document type is very often altered.

The design of a document type is strongly dependent on the requirement of the organization that uses the document type. Furthermore, each organization often designs its own document type to make documents appropriate for a particular purpose. However, these document types share structural similarities in many cases. Thus, documents created according to such document types are often exchanged between organizations and are stored in one database.

Here, an example is shown. Suppose that the document type shown in FIG. 13 is used in multiple departments. In a department, an element "cited references" is added to the document type and the document type shown in FIG. 15 is created as a result.

FIG. 15 shows the document type, which is created by adding the element referred to as "cited references" to the document type as shown in FIG. 13. Nodes 81, 84, 86, and 88 through 95 in FIG. 15 correspond to nodes 51 through 61 in FIG. 13, respectively. In this example, a node 82 whose element type is "body text" is inserted between the node 81 whose element type is "article" and the node 84 representing constructor "REP". A node 83 whose element type is "cited references" is newly added as a child of the node 81. Further, a node 87 whose element type is "reference" is connected with the node 83 via the node 85 representing constructor "REP". An instance of "body text" is an element that has instances of "section", and an instance of "cited references" is an element that holds a list of instances of "reference".

The document type shown in FIG. 15 and the document type shown in FIG. 13 have different structural rules, but are used for the same purpose. If the department that creates the document type shown in FIG. 15 creates documents according to this document type, and other departments create documents according to the document type shown in FIG. 13, plural documents that are created according to a variety of document types, but are used for the same purpose, co-exist in one database.

As described above, a database might have plural document types that have different structural definitions, but are used for the same purpose simultaneously. In particular, when a large scale database is used for a long time, such situation is unavoidable. Since documents that are created according to a variety of document types originally have the same purpose for use, such documents are required to be searched at once.

When a document retrieving is conducted to existing database management systems storing plural documents created according to such a variety of document types, the following problems happen.

The first conventional system needs to designate a document type in a query. Therefore, when documents to be retrieved are created according to a variety of document types, it is a burden for users to organize a query and execute a retrieval for each document type. For instance, documents satisfying the condition of the query shown in FIG. 14 can be created according to both document types shown in FIG. 13 and FIG. 15. Therefore, documents created according to both of the document types must be designated as prospective documents in a retrieving process. In this case, each document type must be designated on the execution of each retrieving process. When the number of document types that have the same purpose for use is large, it is a heavy burden on the user.

In the second conventional system, all documents in the system are always designated as prospective document regardless of the number of document types. Therefore, when the user intends to retrieve a document that is created according to a specific document type, all documents in the database including documents created according to the document types that the user does not desire are searched as well. As a result, since precision (a ratio of the desired document to the retrieved documents) decreases, the user should do an extra work to pick desired documents up from the retrieved results.

Further, in the second conventional system, all documents in the system are always designated as prospective document, even if a query includes an element that is included only in a document created according to a specific document type.

For instance, this is explained by a case that a database that includes both documents created according to the document type shown in FIG. 13 and documents created according to the document type shown in FIG. 15 is searched by using a query including an element type "body text".

FIG. 16 shows an example of a query including "body text" as an element. In this query, a node 101 of "body text" is the root node, and a node 102 of "section" is connected to the node 101. Configurations of nodes 102 through 103 are the same as those of the nodes 71 through 73 shown in FIG. 14, respectively. Since this query designates a condition regarding the element "body text", which is not included in the document type shown in FIG. 13, every document that is created according to the document type shown in FIG. 13 never satisfies the query.

However, in the second conventional system, when the query shown in FIG. 16 is designated, all documents are designated as prospective documents, even though a document created according to the document type shown in FIG. 13 never satisfies the condition. Accordingly, the response time of the system increases because of unnecessary processing.

SUMMARY OF THE INVENTION

The present invention has been made in view of the above circumstances. An object of the present invention is to provide a document database management system that reduces the response time for retrieving of structured documents and improves precision of the result of retrieval. To achieve the object, as embodied and broadly described herein, this invention provides a document database management system comprising: a document type storage for storing a plurality of document types, each of which defines structural elements of a structured document and which defines a relationship between the structural elements; a document storage for storing documents, each of which is created according to one of the plurality of document types stored in the document type storage; a query input unit for inputting a query that includes the structural elements and the relationship between the structural elements; a document type retriever for retrieving at least one document type from the document type storage, at least part of the structural elements and the relationship therebetween defined by the document type matching the structural elements and the relationship between the structural elements included in the inputted query; and a document retriever for retrieving a document satisfying the inputted query from prospective documents stored in the document storage, each of the prospective documents being created according to the document type retrieved by the document type retriever.

In this document database management system, when the user inputs a query through the query input unit, the document type retriever retrieves document types including part that matches the structure of the inputted query from the document type storage. Then, the document retriever retrieves a document from the prospective documents, each of which is created according to one of the retrieved at least one document type. Since structured documents created according to document types unsatisfying the query, are excluded from the prospective documents, retrieving time is reduced, accordingly.

This invention further provides a method for retrieving a document from a document database that stores a plurality of structured documents, comprising the steps of : inputting a query that includes structural elements of a structured document and a relationship therebetween; retrieving at least one document type, which defines structural elements of a structured document and a relationship therebetween, at least part of the structural elements and the relationship therebetween defined by the one document type matching the structural elements and the relationship therebetween included in the inputted query; and retrieving a document satisfying the inputted query from prospective documents stored in the document database, each of the prospective documents being created according to the retrieved document type.

By this document database retrieving method, when a query is inputted, only the documents in the document database, each of which is created according to one of the retrieved document types, are searched. Since structured documents created according to the document type unsatisfying the query, are excluded from the prospective documents, retrieving time is reduced, accordingly.

DETAILED DESCRIPTION OF THE PREFERRED EMBODIMENT

An embodiment of the present invention is explained with reference to the drawings hereinafter.

Figure 1:
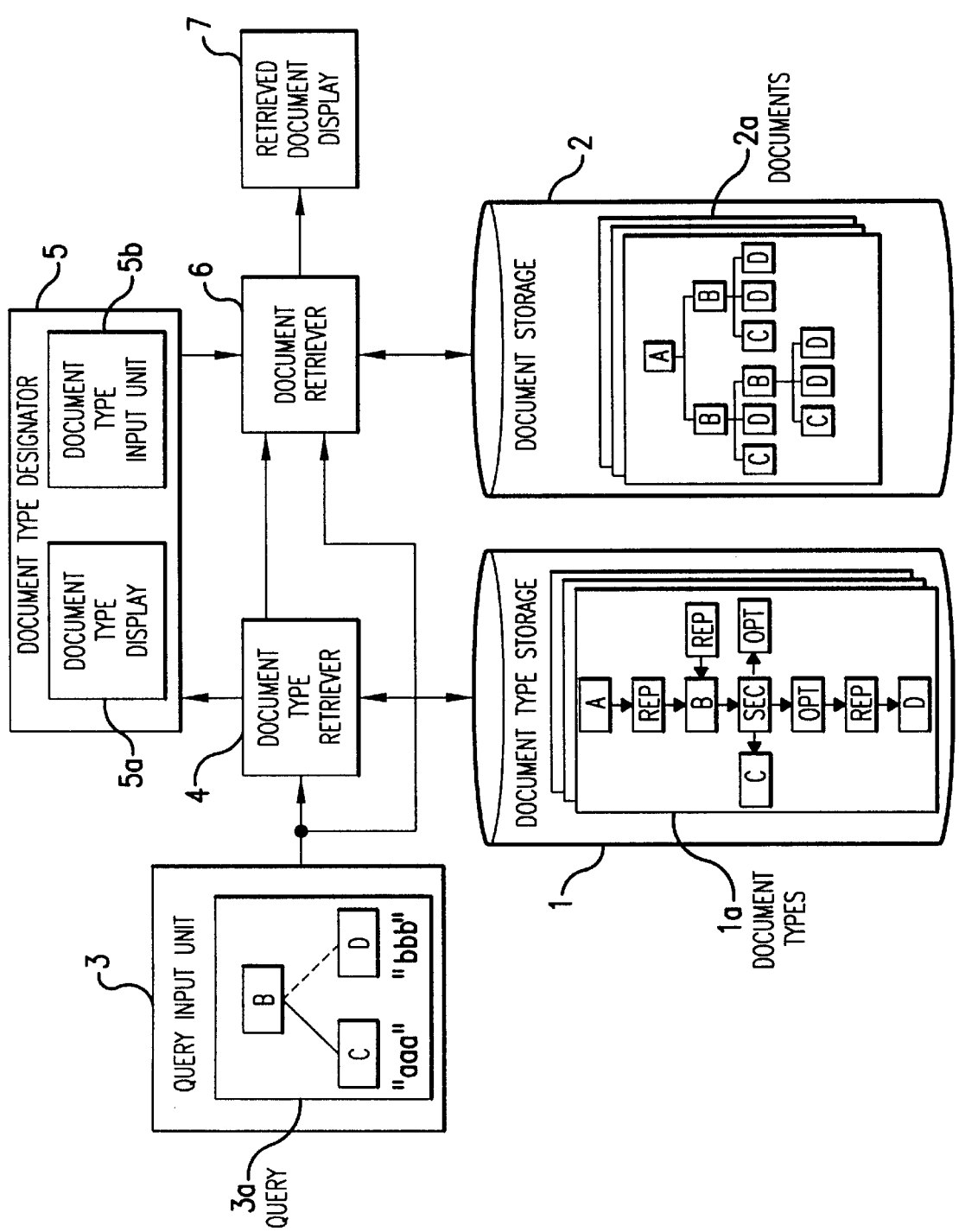
FIG. 1 is a block diagram illustrating the present invention.

FIG. 1 is a block diagram illustrating an outline of the configuration of the present invention. The document database management system of the present invention includes a document type database 1 and a document database 2. The document type database 1 stores plural document types 1a each of which defines a permissible structure of its documents. Each of the document type 1a is represented as a directed graph comprising nodes, each of which indicates an element type or a constructor. The document database 2 stores plural documents, each of which is created according to one of the plural document types 1a. Each of the documents 2a is a structured document and is represented as a tree structure.

Query input unit 3 takes a query 3a as input, which is a condition that documents to be retrieved should satisfy; the query 3a is designed by the user. This query includes a designation such as an element type of an element in a document, a connection relationship between elements, and a string that is included in a text in an element.

Once the query 3a is inputted thereto, the document type retriever 4 compares between the query 3a and the document types in the document type database 1 and retrieves specific document types that can generate a document satisfying the query 3a. Then, the document type retriever 4 communicates the retrieved document types to the document type designator 5 and the document retriever 6.

The document type designator 5 includes the document type display 5a and document type input unit 5b. The document type display 5a displays a list of document types retrieved by the document type retriever 4 on a screen of a display device such as CRT. The document type input unit 5b takes at least one document type as an input designated by the user by using a keyboard, a mouse or the like. The user designates at least one document type from those document types displayed on the screen, while excluding the document type that never generates a desired document. The designated document type is supplied to the document retriever 6.

The document retriever 6 only designates documents that are created according to the document type received from the document type designator 5 as prospective documents, and retrieves a document satisfying the condition of the query 3a from the plural documents 2a stored in the document database 2. The retrieved document is displayed on a screen of retrieved document display 7.

As described above, when the user creates and inputs a query, only document types that can generate the documents satisfying the query 3a are retrieved from the document type database 1. Then, the user can designate only the desired document types from the retrieved document types. Accordingly, the total number of prospective documents is reduced, and the ratio of the documents that the user originally intended to the retrieved documents is increased. That is, precision is improved. In addition, since only the documents created according to the document types designated by the user are practically searched, the search time is reduced.

Furthermore, since the user can retrieve the documents that are created according to a variety of document types by using a single query, a burden of specifying query for the user is reduced. In addition, when the user designates document types by using the document type designator 5, since the user can select at least one desired document types from the document types retrieved by the document type retriever 4, it is easier for the user to determine which document type is to be designated or not, than to do so with the conventional arts.

The document type retrieved by the document type retriever 4 can directly be used as the designated document type. In this case, the document type designator 5 is not necessary.

Next, an example of the document database management system utilizing the present invention is explained. In the following example, the system creates a corresponding table for each document type, and compares a query with a document type by using the created corresponding table to retrieve a document type more efficiently.

Figure 2:
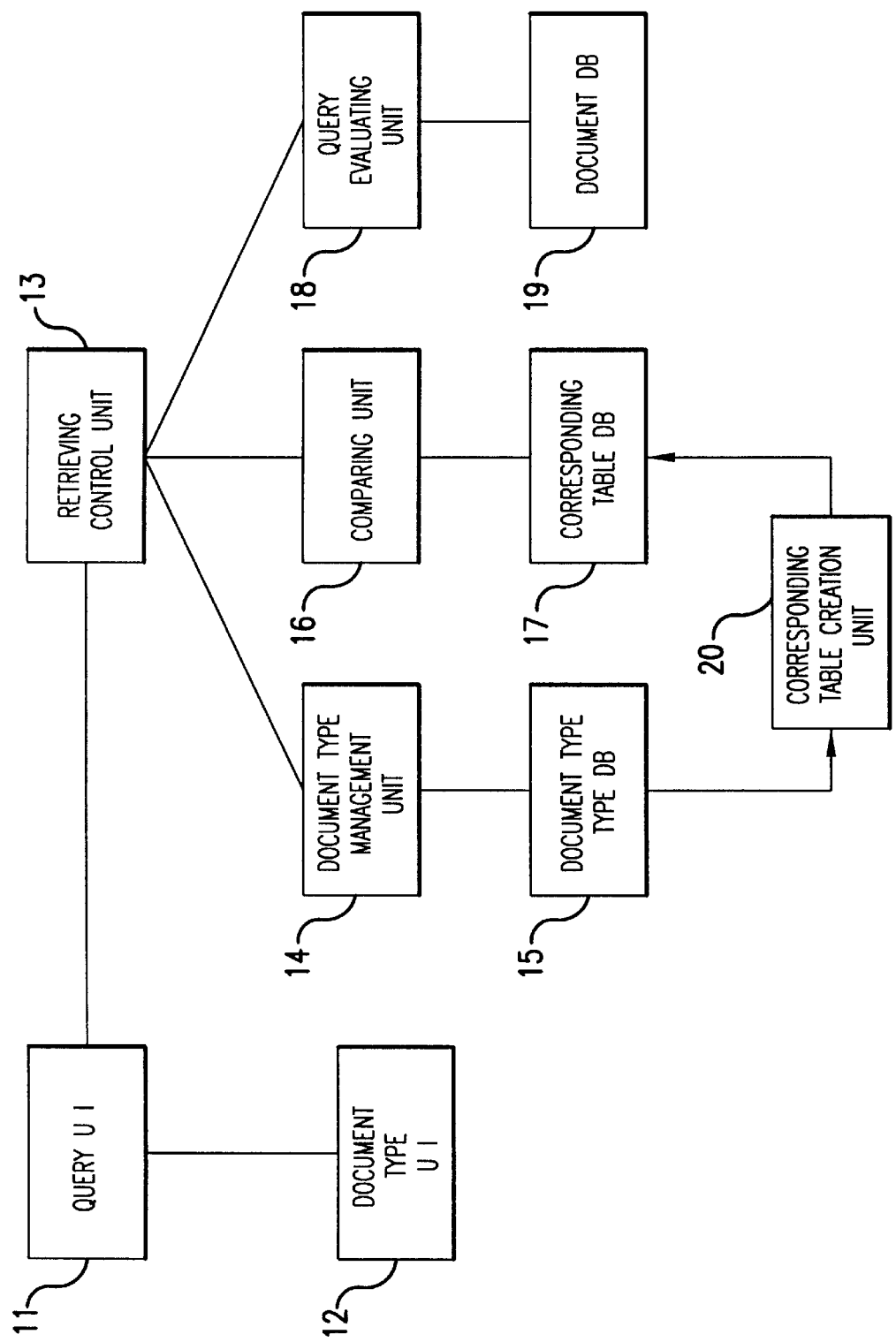
FIG. 2 is a block diagram illustrating a schematic configuration of the database management system of the present invention.

FIG. 2 is a block diagram showing a schematic configuration of the document database management system of the present invention. The document database management system has a query user interface (query UI) 11 and a document type user interface (document type UI) 12. This system is provided with retrieval processing function comprising a retrieving control unit 13, a document type management unit 14, a comparing unit 16, and a query evaluating unit 18. Furthermore, this system has a data storage function comprising a document type database (document type DB) 15, a corresponding table database (corresponding table DB) 17 and a, document database (document DB) 19. This system also has a corresponding table creation unit 20.

The query UI 11 provides an operating circumstance that the user can create a query and input an executing instruction. In this example, a query configured by the graphical user interface is inputted therethrough. The query UI 11 has both functions of the query input unit 3 and the retrieved document display 7 as shown in FIG. 1.

The document type UI 12 provides a circumstance for displaying a list of document types that can generate documents satisfying the condition of the query and for selecting document types from the displayed list. The document type UI 12 has a function equivalent to that of the document type designator 5 shown in FIG. 1.

The retrieving control unit 13 carries out the query inputted by the query UI 11. More specifically, when the user inputs an instruction to execute a query, the retrieving control unit 13 receives document types stored in the document type DB 15 from the document type management unit 14. Then, the retrieving control unit 13 supplies the received document types and the inputted query to the comparing unit 16, and then receives a list of the document types that can generate documents satisfying the query as a return value. The retrieving control unit 13 communicates the list to the document type UI 12 via query UI 11, and receives a list of document types designated by the user from the document type UI 12. Then, the retrieving control unit 13 supplies the list of the document types received from the document type UI 12 and the query to the query evaluating unit 18, and receives a retrieving result as a return value. The retrieving result is supplied to the query UI 11.

The document type management unit 14 stores document types to the document type DB 15 and retrieves document types from the document type DB 15. It supplies the designated document type stored in the document type DB to the retrieving control unit 13 in response to a request from the retrieving control unit 13. When the comparing unit 16 receives a query and document types from the retrieving control unit 13, the comparing unit 16 compares the query with each of the document types by using a corresponding table stored in the corresponding table DB 17 to determine whether the document type can generate a document satisfying the query or not. Then, the comparing unit 16 supplies a list of document types, each of which is determined as a document type capable of generating a document that satisfies the query, to the retrieving control unit 13. The retrieving control unit 13 supplies the query and the received list of document types to the query evaluating unit 18. When the query evaluating unit 18 receives the query and a list of the document types, the query evaluating unit 18 searches only the documents that are created according to the received document types, and retrieves documents which satisfy the query.

The retrieving control unit 13 has both functions of the document type retriever 4 and the document retriever 6 shown in FIG. 1; the comparing unit 16 compares document types with a query; and the query evaluating unit 18 retrieves documents.

The document type DB 15 stores plural document types. Many of the document types stored in the document type DB 15 resembles each other. The corresponding table DB 17 stores corresponding tables, each of which is created from a document type stored in the document type DB 15. The corresponding table includes a tuple of a starting element, a set of adjacent elements and a set of reachable elements. A starting element is an element in the document type; an adjacent element is an element that can appear as a child of the starting element; and a reachable element is an element that can appear as a descendant of the starting element. The document DB 19 stores documents each of which is created according to one of the document types stored in the document type DB 15.

When a new document type is registered to the document type DB 15, the corresponding table creation unit 20 analyzes the document type, creates a new corresponding table, and then registers the created corresponding table to the corresponding table DB 17.

Figures 3, 4:
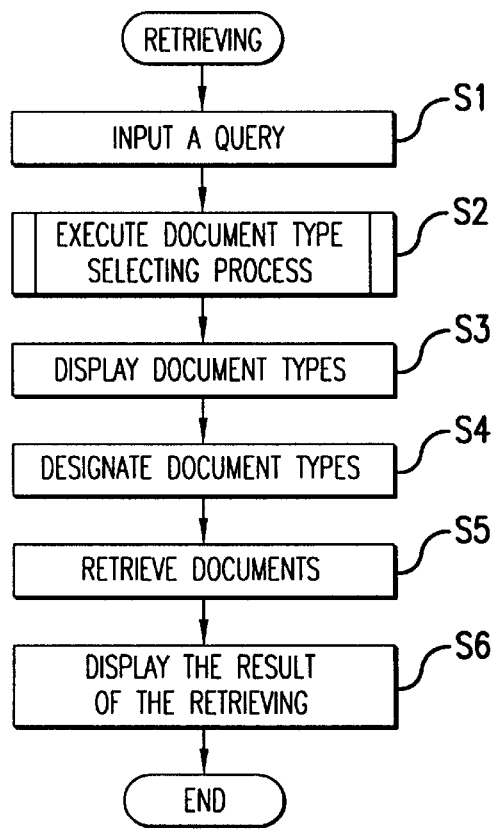
FIG. 3 illustrates a corresponding table which is created according to the document type shown in FIG. 13.
FIG. 4 is a flowchart illustrating an outline of a retrieving process.
Figure 13:
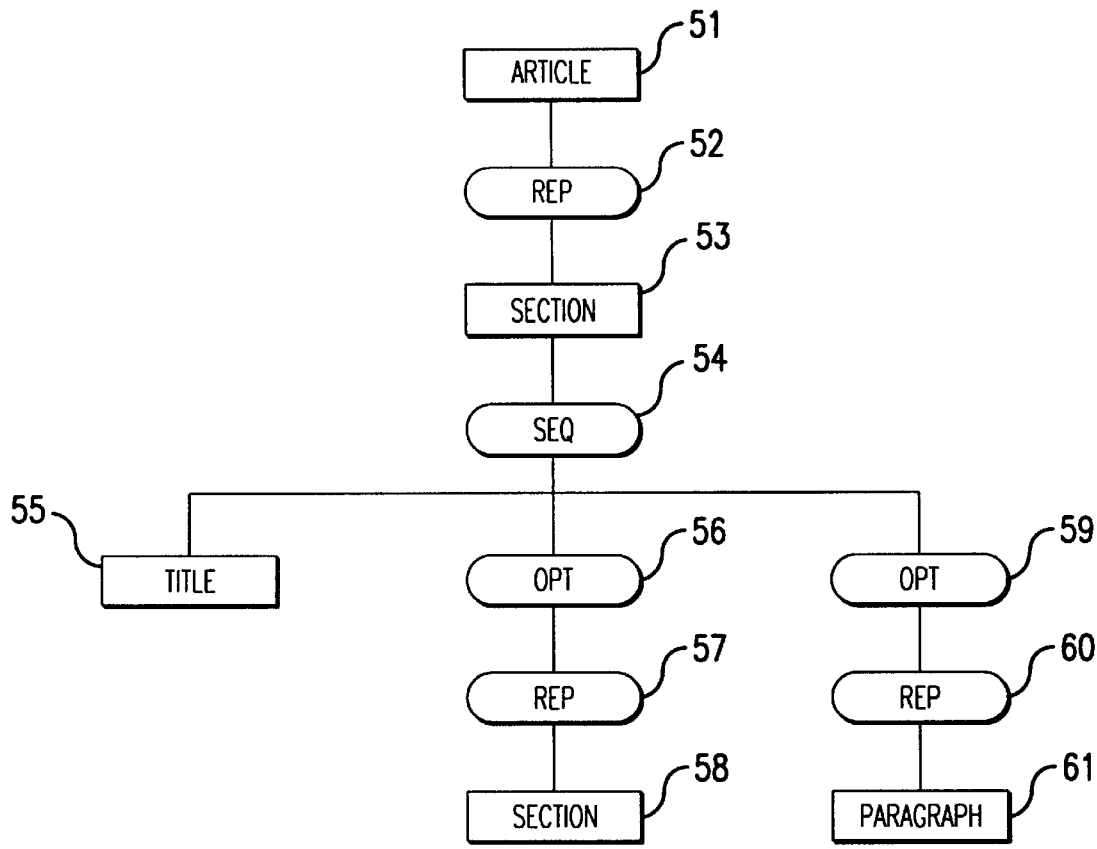
FIG. 13 illustrates a syntactic rule to which the logical structure shown in FIG. 12 conforms.

FIG. 3 shows a corresponding table created from the document type shown in FIG. 13. The corresponding table includes three registration items: a starting element, adjacent elements and reachable elements.

In this example, when the starting element is "article", the adjacent element is "section", and the reachable elements are "section", "title" and "paragraph". When the starting element is "section", the adjacent elements are "title", "paragraph" and "section", and reachable elements are "section", "title" and "paragraph". When the starting element is "title" or "paragraph", each of the adjacent element and the reachable element is an empty set, which is represented by "Ó" in this figure. in this case, "title" and "paragraph" have neither children nor descendants. A tuple comprising a starting element, adjacent elements and reachable elements is referred to as "entry" hereinafter.

The document management database system described above initiates a retrieving process when a query is inputted thereto. In this example, a query to be designated can include a condition regarding elements of a document, a relationship between the elements and a text included an element. A parent-child relationship or a ancestor-descendant relationship can be designated as the relationship between elements. Conditions regarding the order of elements, such as sibling relationships, are not used in this example. The query is conjunctive. When plural conditions regarding the relationship between elements are designated, a retrieved result satisfies all the conditions.

Steps of a retrieving process are explained in the following.

FIG. 4 is a flowchart illustrating an outline of the retrieving process.

[S1] When the user inputs a query through the query UI 11, the query UI communicates the inputted query to the retrieving control unit 13.

[S2] A document type selecting process is executed. More specifically, the retrieving control unit 13 invokes a document type selecting process routine, and obtains a return value. The document type selecting process creates a list of document types that can generate documents satisfying the query. This process is explained in detail later.

[S3] The list of the document types created by the document type selecting process is displayed on a screen of a display device. More specifically, the retrieving control unit 13 receives the list of the document types from the comparing unit 16, communicates the list to the document type UI 12 via the query UI 11, and then the document type UI 12 displays the received list on the display device.

[S4] The user selects at least one document type from the document types displayed on the display device by using the document type UI 12.

[S5] The documents created according to the selected document type are designated as prospective document, and documents satisfying the query are retrieved from the prospective documents. The query evaluating unit 18 receives the query and a list of the designated document types from the document control unit 13, and executes this process.

[S6] The query evaluating unit 18 communicates the retrieved documents to the query UI 11. Then, the query UI 11 displays a list of the retrieved documents on the screen of the display device.

The outline of the retrieval process has been explained above. Next, details of the document type selecting process routine are explained.

Figure 5:
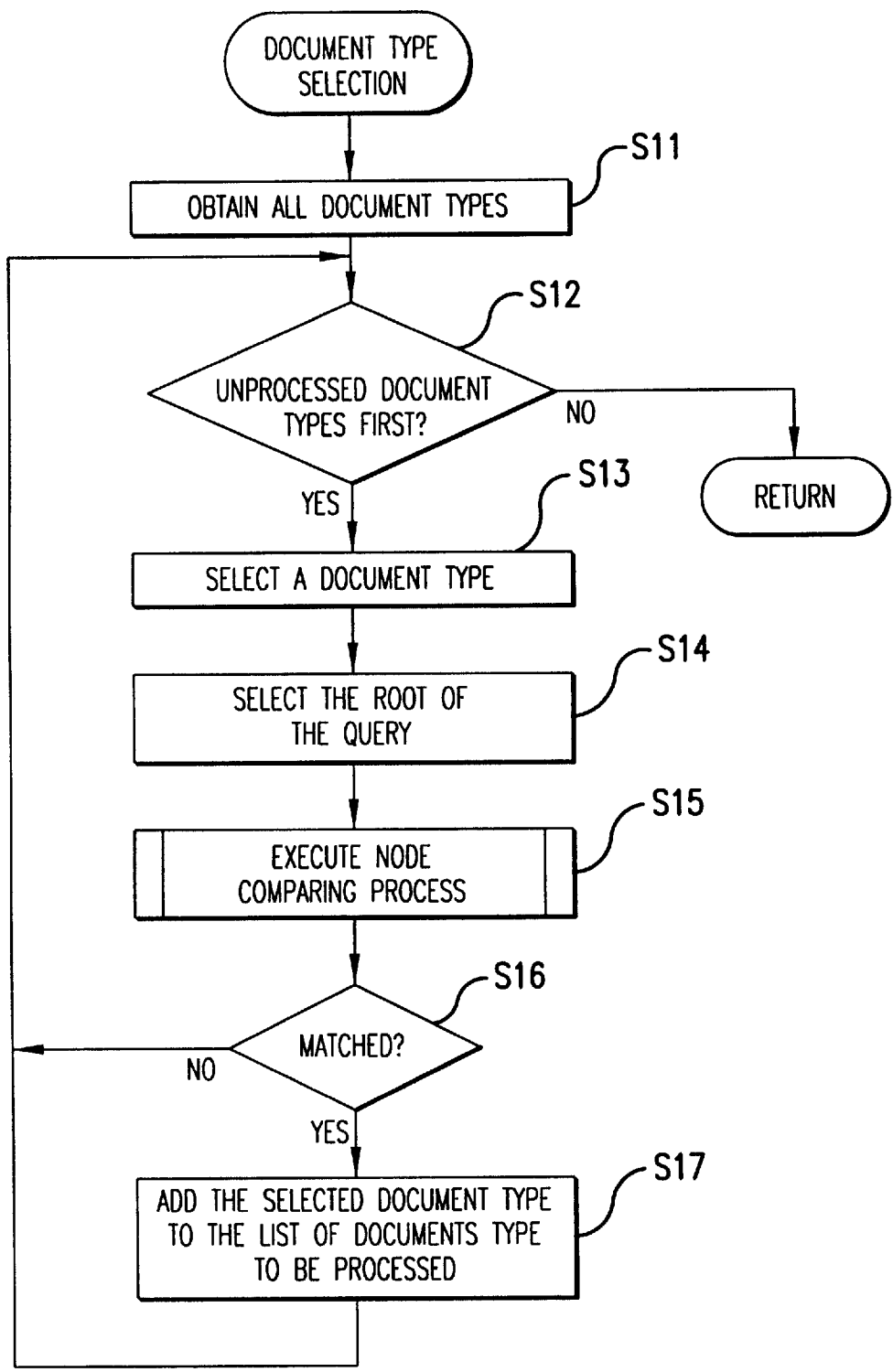
FIG. 5 is a flowchart illustrating a document type selecting process.

FIG. 5 is a flowchart illustrating the document type selecting process. The retrieving control unit 13 executes this process in step S2 of the flowchart shown in FIG. 4.

[S11] The retrieving control unit 13 receives all document types stored in the document type DB 15 from the document type management unit 14. The received document types are stored in a queue.

[S12] It is checked whether the queue has elements, i.e., whether all of the document types are examined by the node comparing process or not. The empty queue means that the comparing processes for all received document types have been completed. If there is an unprocessed document type, the control goes to step S13. Otherwise, i.e., all the document types are examined by the comparing process, the control is returned to step S2 shown in FIG. 4 with a return value that is a list of the document types to be processed. A document type to be processed is a document type including part that matches the structure of the inputted query.

[S13] The head element of the queue is taken out and is selected.

[S14] The root of the query is selected.

[S15] The node comparing process is executed. More specifically, the root of the query and the selected document type are inputted to the comparing unit 16. Then, a return value is "true" or "false". Details of this step are explained later.

[S16] It is determined whether the selected document type is to be processed or not. As a result of the node comparing process, if the return value is "true", it is determined that the selected document type is to be processed, and the control goes to step S17. On the other hand, if the return value is "false", it is determined that the selected document type is not to be processed, and the control goes to step S12.

[S17] The document type that is determined to be processed is listed up. Then, the control goes to step S12.

Thus, the process described above retrieves all document types to be processed, i.e., all document types including part that matches the structure of the query.

Figure 6:
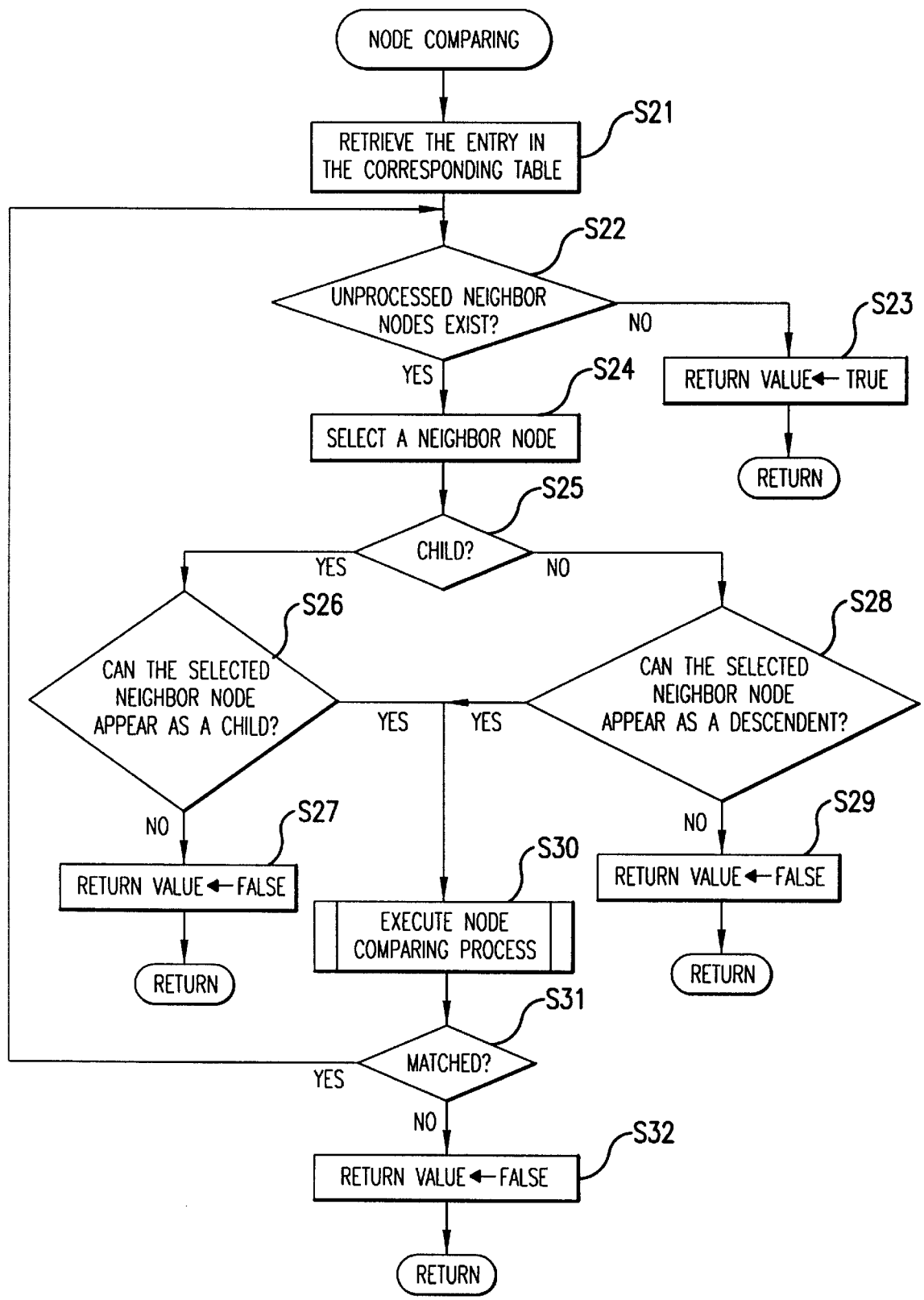
FIG. 6 is a flowchart illustrating the node comparing process.

FIG. 6 is a flowchart of the node comparing process. The comparing unit 16 executes this process. The node comparing process is executed when the process is invoked in step S15 shown in FIG. 5, and when the process is recursively invoked in step S30 of the node comparing process. The input to this process is a node of the query. The output (return value) of this process is a Boolean value that indicates whether the selected document type includes part that matches to the substructure of the query whose root is the input node. When this process is invoked by step S15, the root node of the query is inputted thereto. This process is executed, referring to the corresponding table stored in the corresponding table DB 17.

[S21] The corresponding table created from the selected document type is scanned to retrieve the entry whose starting element is the inputted node. At the same time, all neighbor nodes of the inputted node in the query are appended to the queue. A neighbor node is a node which is connected to the inputted node as a child or a descendant in the query.

[S22] It is checked whether there is an unprocessed neighbor node by checking the emptiness of the queue. If the queue is not empty, one or more unprocessed neighbor nodes exist.

[S23] If the queue is empty, the control returns to the place where the current process is invoked with a return value "true", since the current comparing process is completed for all neighbor nodes. If the current process is invoked by step S15 shown in FIG. 5, the control goes to step S16. If the current process is invoked by step S30 described later, the control goes to step 31.

[S24] If the queue is not empty, the head node of the queue is selected because there is an unprocessed node.

[S25] It is determined whether the selected node is designated as a child of the inputted node. If the selected node is designated as a child of the inputted node, the control goes to step S26. If the selected node is not designated as a child of the inputted node, it is determined that the selected node is designated as a descendant of the inputted node, and the control goes to step S28.

[S26] It is determined whether the selected node is included in the adjacent elements in the entry retrieved in step S21. If the selected node is included therein, the control goes to step S30. Otherwise, the control goes to step S27.

[S27] The return value is set to "false". Then, the control returns to the place where the current node comparing process is invoked.

[S28] It is determined whether the selected node is included in the reachable elements in the entry retrieved in step S21. If the selected node is included therein, the control goes to step S30. If the selected node is not included therein, the control goes to step S29.

[S29] The return value is set to "false". Then, the control returns to the place where the current node comparing process is invoked.

[S30] The node comparing process is recursively invoked with the node selected in step S24 as the input node. The return value is "true" if the results of all node comparing processes executed for nodes that descend from the node selected in step S24 are "true". On the other hand, at least one node comparing process executed for a node descending from the selected node returns "false", the return value is "false".

[S31] The return value of the node comparing process in step S30 is checked. If the return value of step S30 is "true", it is determined that the selected document type includes part that matches the substructure of the query whose root is the input node, and the control goes to step S22. If the return value of step S30 is "false", it is determined that the selected document type does not include part that matches the substructure of the query whose root is the input node, and the control goes to step S32.

[S32] The return value is set to "false". Then, the control returns to the place where the current node comparing process is invoked.

After the execution of the node comparing process, if the control returns to step S15 in the flowchart shown in FIG. 5 with the return value "true", it is determined that the node comparing processes executed for all nodes in the query returns with "true" value. It means that the selected document type can generate a document that satisfies the query.

A concrete example of retrieving is explained. Suppose that the following query represented by a directed graph is designated.

Figure 7:
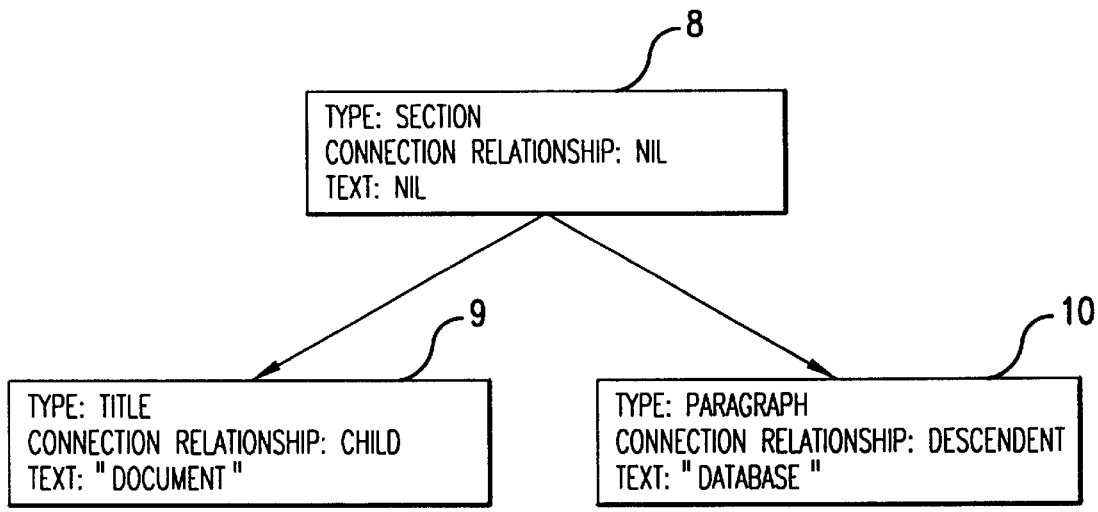
FIG. 7 illustrates a query represented by a directed graph.
Figure 14:
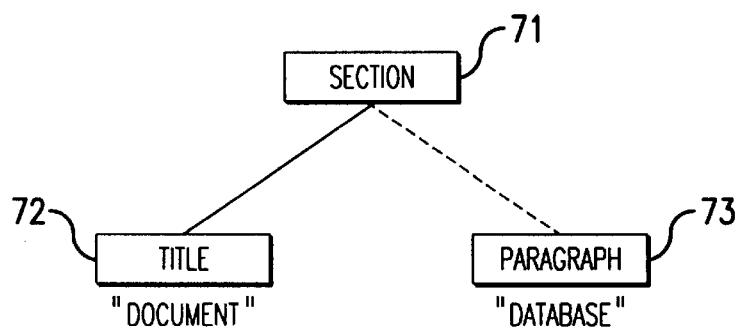
FIG. 14 is an example illustrating a query represented graphically.
Figure 15:
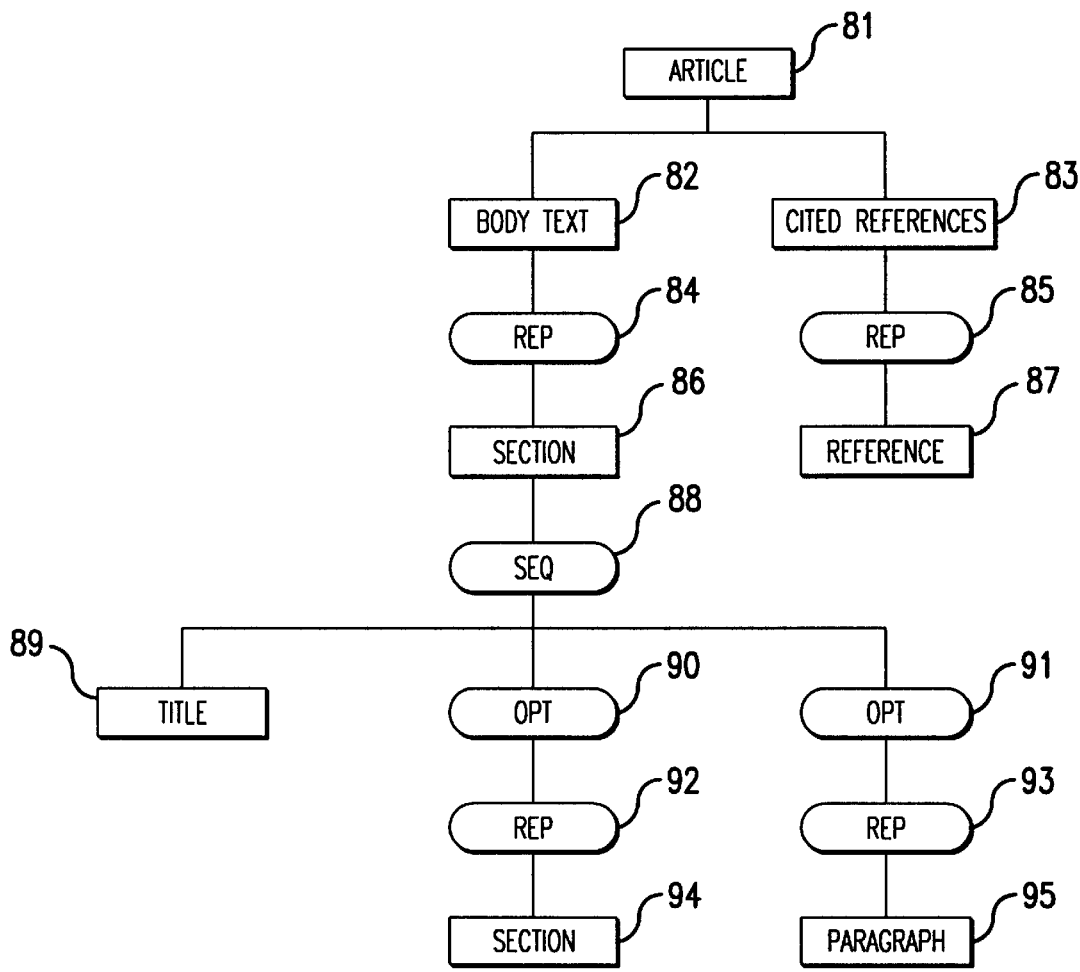
FIG. 15 illustrates a document type in which "cited references" is added to the document type shown in FIG. 13.

FIG. 7 shows a query represented by a directed graph. This query is equivalent to the query shown in FIG. 14. The nodes 8 through 10 in this figure correspond to the nodes 61 through 63 shown in FIG. 14, respectively. In this query, each node is provided with retrieving conditions comprising "type", "connection relationship" and "text". The condition on "type" of a node specifies the element type of the node. The condition on "connection relationship" between nodes specifies whether the subordinate node connected to the superior node by an arc is a child of the superior node or a descendant of the superior node. The "text" condition on a node specifies that the string should be included in text of the node. This figure uses "nil" to show that a condition is not specified.

When the query shown in FIG. 7 is inputted, and the document type shown in FIG. 13 is selected in step S13 shown in FIG. 5, the corresponding table shown in FIG. 3 is referred to. FIG. 13 shows that a "section" in this document type can have a "title", a "paragraph" or a "section", as a child. The "section" can also have a "title", a "paragraph" or a "section" as a descendant. The query shown in FIG. 7 designates that a "section" should have a "title" as a child and a "paragraph" as a descendant. As a result of the comparing process that compares the query shown in FIG. 7 with the corresponding table shown in FIG. 3, it is determined that the document type includes part that matches the structure of the query.

Figure 16:
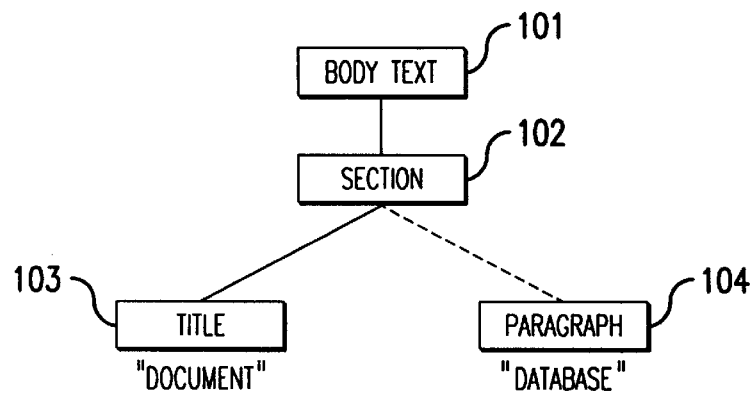
FIG. 16 is an example illustrating a query including "body text" as an element.

On the other hand, when the query shown in FIG. 16 is inputted, and the document type shown in FIG. 13 is selected in step S13 shown in FIG. 5, the element type of the root node in the query is "body text", but there is no entry whose starting element is "body text" in the corresponding table shown in FIG. 3. As a result of the comparing process, it is determined that the document type does not include part that matches the structure of the query. Accordingly, no documents created according to the document type shown in FIG. 13 are designated as prospective documents.

As described above, before an actual retrieving of documents, the query is compared with document types, and document types that can generate a document satisfying the query are retrieved. Since only the documents that are created according to the retrieved document type are designated as prospective documents, the retrieval time is reduced very much.

In addition, the user can select desired document types from the document types including part that matches the structure of the query, and thus, only the documents that are created according to the document types designated by the user can be the prospective documents; the user can exclude document types that the user thinks unnecessary. The documents created according to the document type that is not designated by the user is not retrieved, even though the documents satisfy the query. Therefore, the precision improves.

Next, the corresponding table creation process is explained. When a new document type is registered to the document type DB 15, the corresponding table creation unit 20 receives the structure of the new document type, and executes the corresponding table creation process. The document type stored in the document type DB 15 are represented by directed graphs.

Figure 8:
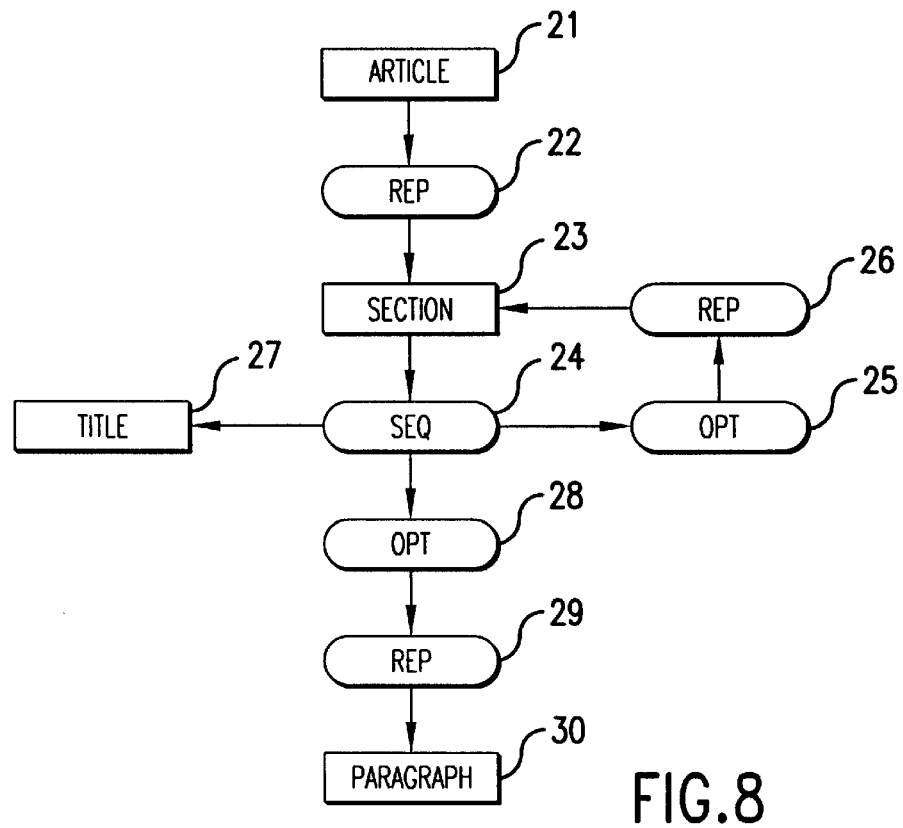
FIG. 8 is a directed graph representing the document type shown in FIG. 13.

FIG. 8 shows a directed graph corresponding to the document type shown in FIG. 13. The directed graph includes nodes that define element types (represented by rectangular nodes in the figure) and nodes that define constructors (represented by oval nodes in the figure) These nodes are connected by arcs (represented by arrows in the figure).

In FIG. 8, the node 21, which defines an element type "article", is the root node. The node 21 is connected to node 22, which is a constructor "REP", by an arc. The node 22 is connected to node 23, which defines an element type "section". The node 23 is connected to node 24, which is a constructor "SEQ". The node 24 is connected to node 27, which defines an element type "title", and two nodes 25 and 28, each of which is a constructor "OPT". The nodes 25 and 28 are respectively connected to nodes 26 and 29, each of which is a constructor "REP". The node 26 is connected to the node 23. The node 29 is connected to a node 30, which defines an element type "paragraph".

A corresponding table is created from a document type represented by the directed graph described above.

Figure 9:
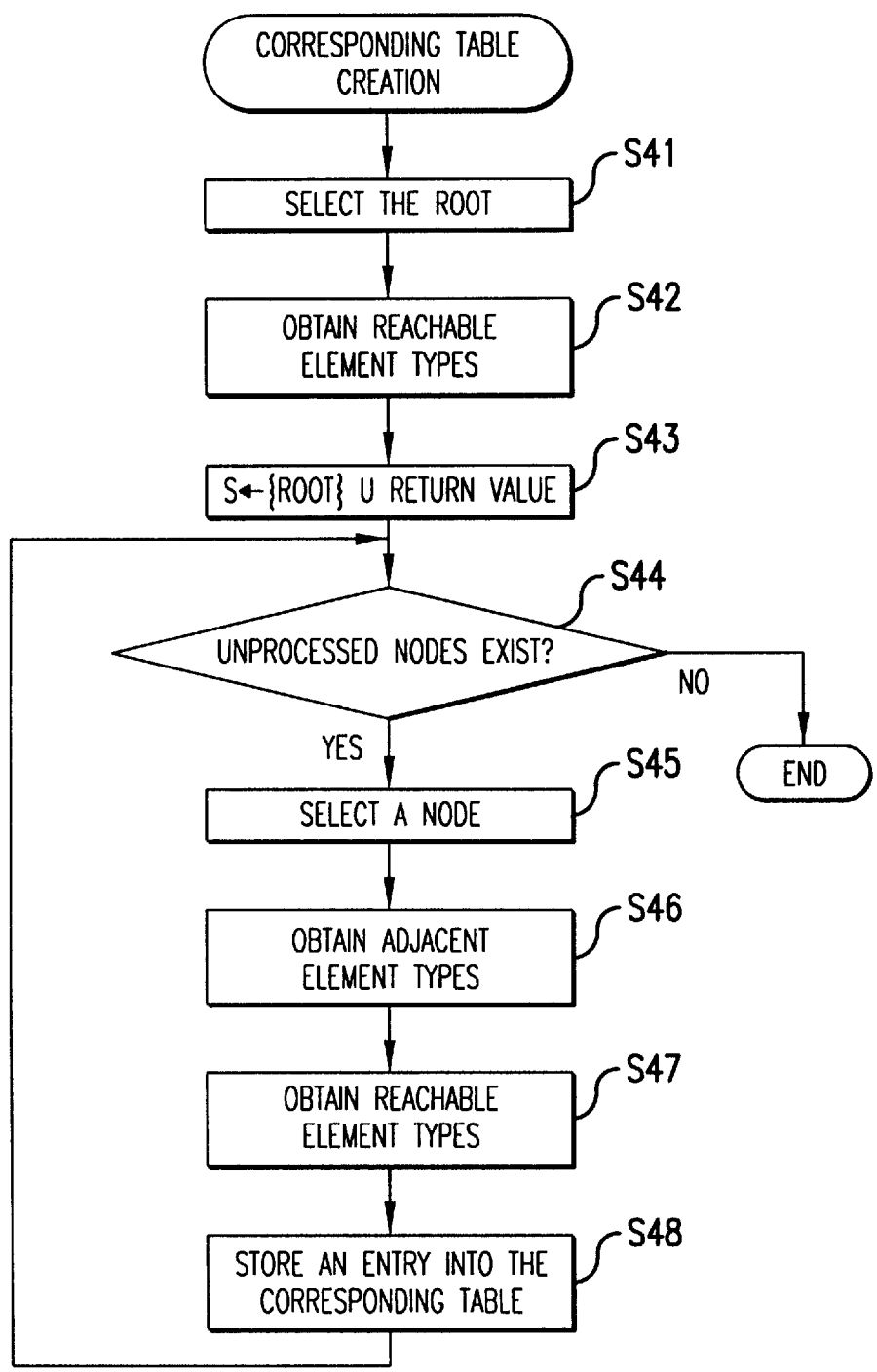
FIG. 9 is a flowchart illustrating a corresponding table creating process.

FIG. 9 is a flowchart of the corresponding table creation process. The corresponding table creation unit 20 executes this process. The input to the process is a newly created document type. The newly created document type is registered to the document type DB 15 in a form of a directed graph including nodes that indicate element types and constructors. A node indicates either an element type or a constructor hereinafter.

[S41] The root node of the inputted document type is selected.

[S42] All element types that can be reached from the root node are collected. Thus, a set of all element types in the inputted document type except for the root node is obtained. This process is explained in detail later.

[S43] The set that is union of the return value of the process in step S42 and the root node are set to the variable S. Thus, the variable S has all element types in the inputted document type.

[S44] It is checked whether the variable S is empty or not. If the variable S is empty, all element types that are set as starting elements have been processed. If the variable S includes at least one node, the control goes to step S45. Otherwise, the corresponding table creation process terminates.

[S45] A node is taken out from the variable S and is selected. Since the variable S only includes element type nodes, the selected node is always an element type node.

[S46] The set of element types that are adjacent to the selected node is obtained. This process is explained in detail later.

[S47] The set of element types that can be reached from the selected node is obtained. This process is the same as the process executed in step S42.

[S48] An entry, that is a tuple of "starting element", "adjacent elements", and "reachable elements", is registered to the corresponding table DB 17: the "starting element" is the element type of the selected node; the "adjacent elements" is the set of element types that are adjacent to the selected node; which is obtained by the process in step S46; the "reachable elements" is the set of element types that can be reached from the selected node, which is obtained by the process in step S47. Then, the control goes to step S44.

The outline of the corresponding table creation process has been explained. Next, the process to obtain a set of adjacent element types and the process to obtain a set of reachable element types are explained in detail.

Figure 10:
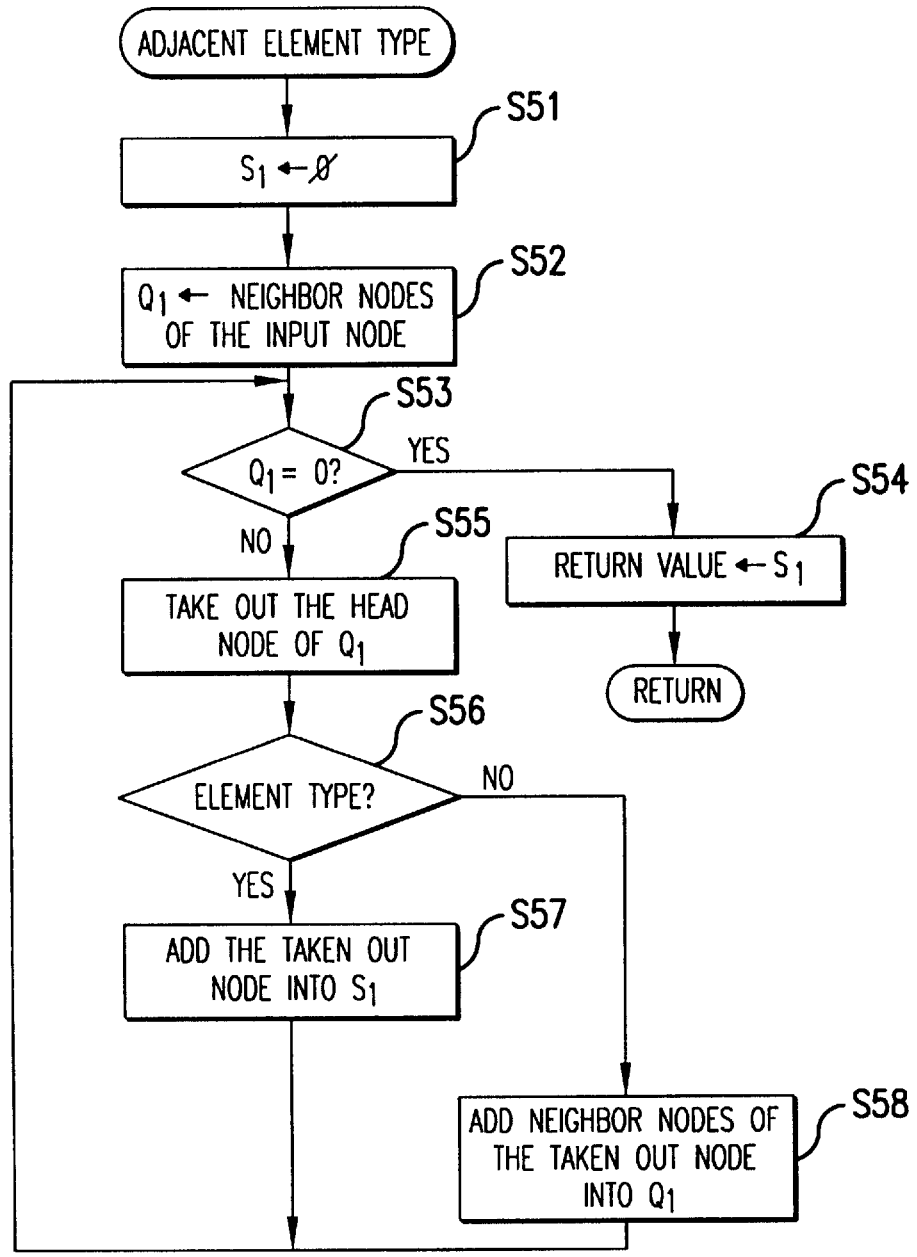
FIG. 10 is a flowchart illustrating a process to configure a set of adjacent element types.

FIG. 10 is a flowchart of a process to obtain a set of adjacent element types. When step S46 shown in FIG. 9 calls this process, the corresponding table creation unit 20 executes this process. The input to this process is a node defining an element type. The output of this process is a set of element types that are adjacent to the inputted element type node.

[S51] Variable S1, which holds a set of element types, is initialized to empty set.

[S52] All neighbor nodes of the inputted node are set to variable Q1, which is a queue of element types, as the initial value. The nodes include both nodes defining element types and nodes defining constructors. A "neighbor node of a specific node" in this flowchart and the flowchart shown in FIG. 11 means a node that is directly connected to the specific node by an arc in the directed graph representing a document type.

[S53] It is checked whether the length of the variable Q1 (the number of nodes included in the queue) is zero or not. If the length of the variable Q1 is zero, the control goes to step S54. Otherwise, the control goes to step S55.

[S54] When the length of the variable Q1 is zero, all element types adjacent to the inputted element type node have already been included in the variable S1. Then, the control returns to the place where the current process is invoked, with the value of the variable S1 as a return value.

[S55] A node at the top of the variable Q1 is taken out.

[S56] It is checked whether the node taken out from the variable Q1 is an element type or not. If the node is an element type, the control goes to step S57. Otherwise, the control goes to step S58.

[S57] The element type of the node is added to the variable S1, and the control goes to step S53.

[S58] All neighbor node of the node are added to the end of the variable Q1. Then the control goes to step S53.

Thus, a set of adjacent element types is obtained. All element types that are adjacent to the inputted element type node are collected, ignoring nodes indicating constructors.

Figure 11:
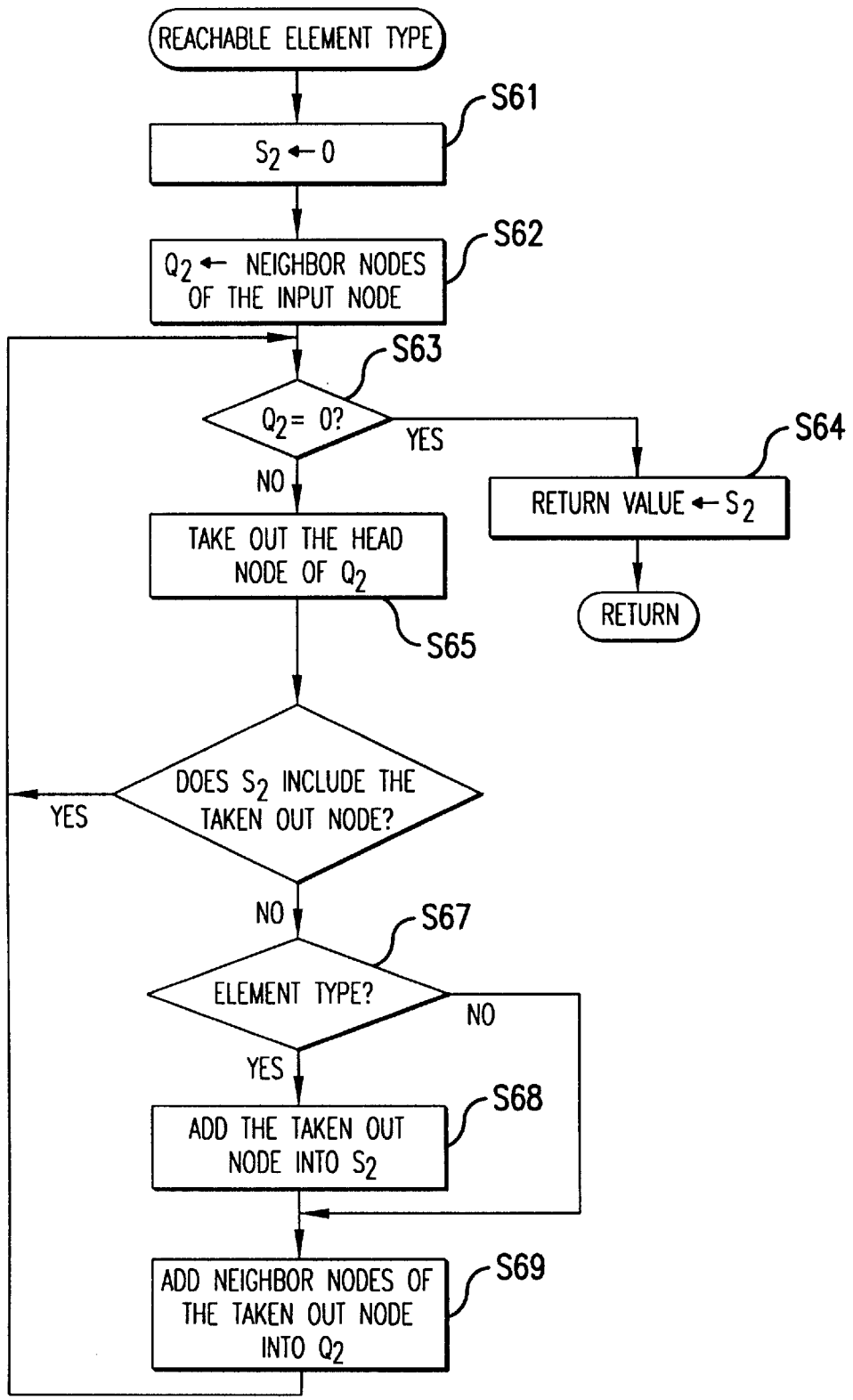
FIG. 11 is a flowchart illustrating a process to configure a set of reachable element types.
Figure 12:
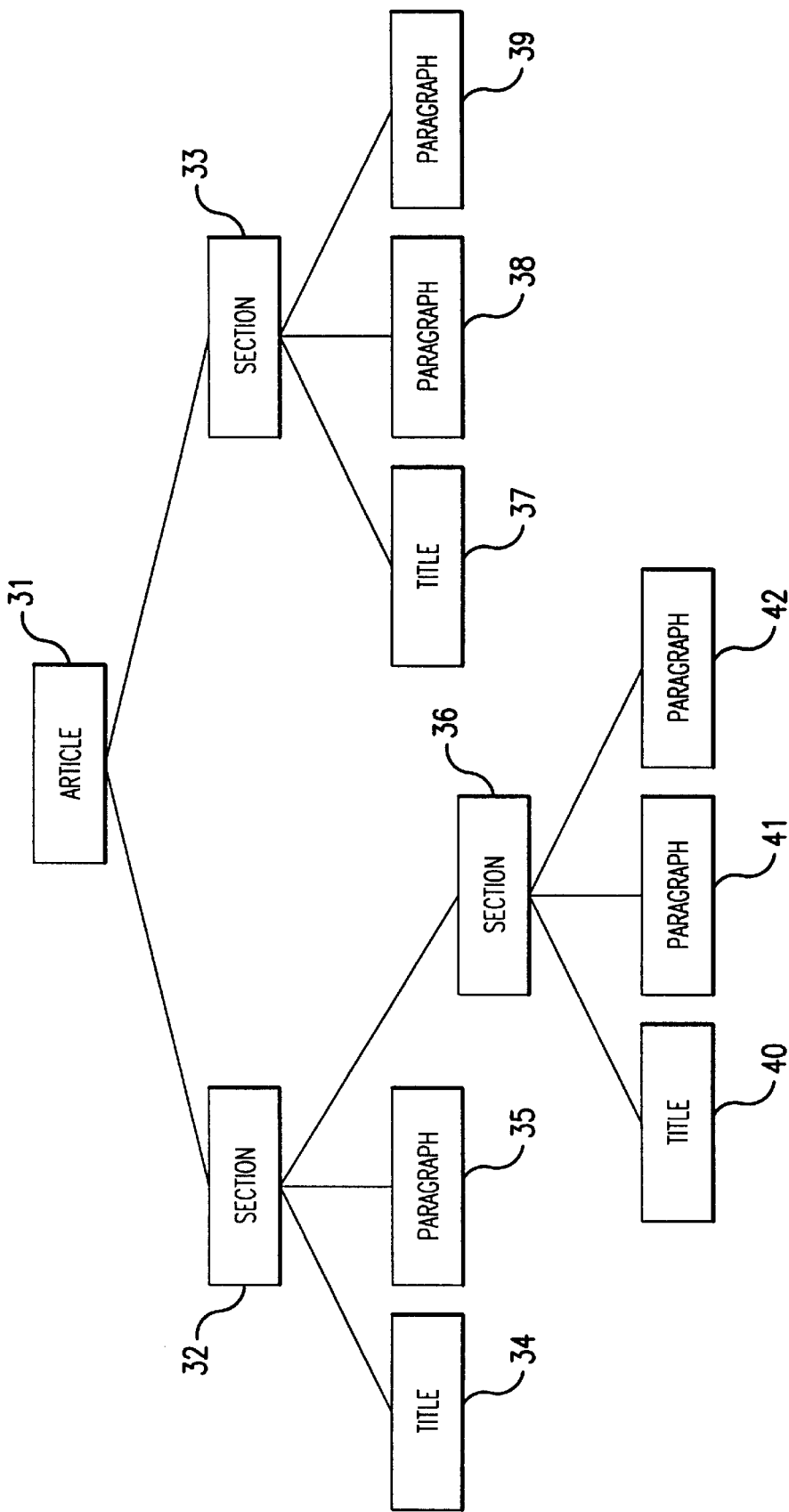
FIG. 12 illustrates the logical structure of a structured document.

FIG. 11 is a flowchart illustrating a process to obtain a set of reachable element types. When step S42 or step S47 shown in FIG. 9 calls this process, the corresponding table creation unit 20 executes this process. The input to this process is an element type. The output of this process is a set of element types that can be reached from the inputted element type.

[S61] Variable S2, which holds a set of element types, is initialized to empty set.

[S62] All neighbor nodes of the inputted node are set to variable Q2, which is a queue of element types, as the initial value. The nodes include both nodes defining element types and nodes defining constructors.

[S63] It is checked whether the length of the variable Q2 is zero or not. If the length of the variable Q2 is zero, the control goes to step S64. Otherwise, the control goes to step S65.

[S64] If the length of the variable Q2 is zero, all element types that can be reached from the inputted element type node have been included in the variable S2. Then, the control is returned to the place where the current process is invoked, with the value of the variable S2 as a return value.

[S65] A node at the top of the variable Q2 is taken out.

[S66] It is checked whether the node taken out from the variable Q2 is included in the variable S2. If the node is not included in the variable S2, the control goes to step S67. Otherwise, the node has already been determined as a reachable element, so that further determination is not required. Then the control goes to step S63.

[S67] It is checked whether the node taken out from the variable Q2 is an element type or not. If the is an element type, the control goes to step S68. Otherwise, the control goes to step S69.

[S68] The element type of the node is added to the variable S2.

[S69] All neighbor nodes of the node are added to the end of the variable Q2. Then, the control goes to step S63.

Thus, the set of reachable element types is obtained. That is, the set of element types that can be reached from the inputted element type node by traversing nodes via arcs from the inputted node.

When a new document type is created, a new corresponding table is created immediately. In the document retrieving process, a document type comparing process is executed by using the corresponding table, so that it is not required to analyze the structure of a document type in each comparing process. Thus, time for executing the document type comparing is reduced.

As explained above, in the document database management system of the present invention, the document type retriever compares a query with document types, and only the structured documents created according to document types including part that matches the structure of the query are designated as prospective documents. Accordingly, structured documents created according to a variety of document types can be retrieved by using a single query. In addition, the document types that never generate structured documents satisfying the designated query are excluded, needless retrieval processes can be avoided. Thus, execution time is reduced.

Further, by using the document type designator, the user can designate document types from the document types including part that matches the structure of the query. Thus, only the structured documents created according to the document types designated by the user are designated as prospective documents. Therefore, documents created according to the document type that never generates structured documents that the user requires, can be excluded to improve precision.

The document database retrieval method of the present invention compares a query with document types, and only the documents that are created according to the document types including part that matches the structure of the query. Therefore, documents created according to a variety of document types can be retrieved by using a single query. In addition, document types that never generate documents satisfying the designated query are excluded, needless retrieving processes are avoided. Thus, execution time is reduced.

What is claimed is:

1. A document database management system comprising:
    a document type storage for storing a plurality of document types, each of which defines structural elements of a structured document and which defines a relationship between the structural elements;
    a document storage for storing a first number of documents, each of which is created according to one of the plurality of document types stored in the document type storage;
    a query input unit for inputting a query that includes the structural elements and the relationship between the structural elements;
    a document type retriever for retrieving at least one document type from the plurality of document types in the document type storage, at least part of the structural elements and the relationship therebetween defined by the document type matching the structural elements and the relationship between the structural elements included in the inputted query, wherein the retrieved at least one document type identifies a subset of a second number of prospective documents from the plurality of documents stored in the document storage, the second number of prospective documents being less than the first number of documents; and
    a document retriever for retrieving a document satisfying the inputted query from the subset of prospective documents, each of the prospective documents being created according to the at least one document type retrieved by the document type retriever.

2. The document database management system as set forth in claim 1, further comprising:
    a document type designator for designating at least one document type from the at least one document type retrieved by the document type retriever, wherein
    each of the prospective documents is created according to the at least one document type designated by the document type designator.

3. The document database management system as set forth in claim 2, wherein the document type designator includes:
    a document type display for displaying the at least one document type retrieved by the document type retriever; and
    a document type input unit for selecting at least one document type from the at least one document type displayed on the document type display.

4. The document database management system of claim 1, wherein
    each of the plurality of document types defines a super-subordinate relationship between structural elements, and
    the query includes a super-subordinate relationship between structural elements,
    the system further comprising:
    correspondence storage for storing a corresponding relationship for each of the document types stored in the document type storage, the corresponding relationship associates each of the structural elements in the document type with a structural element that descends from each of the structural elements, wherein
    the document type retriever retrieves at least one document type from the document storage, at least part of the structural elements and the super-subordinate relationship therebetween defined by the document type matching the structural elements and the super-subordinate relationship therebetween included in the query, with reference to the corresponding relationship stored in the correspondence storage.

5. The document database management system of claim 4, wherein
    the document type retriever checks whether each of the structural elements in the inputted query is associated with a structural element that descends from each of the structural elements, by the corresponding relationships for a document type in the corresponding storage, and
    if every structural element in the query is associated with a structural element that descends therefrom by the corresponding relationship for the document type, the document type retriever determines that at least part of the structural elements and the super-subordinate relationship therebetween defined by the document type matches the structural elements and the super-subordinate relationship included in the query.

6. The document database management system of claim 4, further comprising:
    document type register for registering a new document type into the document type storage; and
    corresponding relationship creator for creating a new corresponding relationship that associates each structural element defined by the new document type with a structural element that descends from the structural element, and for registering the created corresponding relationship into the correspondence storage.

7. The document database management system of claim 6, wherein the new document type is registered into the document type storage as a directed graph including nodes that indicate element types and constructors, and wherein the corresponding relationship creator performs a correspondence table creation process to thereby create a correspondence table for the new document type, the correspondence table creation process comprising:

identifying a root node of the new document type;

collecting all element type nodes that can be reached from the root node;

selecting one node from one of the root node and the element type nodes;

obtaining a set of adjacent element type nodes that are adjacent to the selected node;

obtaining a set of reachable element type nodes that are reachable from the selected node;

constructing the correspondence table by establishing the selected node as a starting node, the set of adjacent element type nodes as adjacent nodes and the reachable element type nodes as reachable nodes.

8. The document database management system of claim 4, wherein the correspondence storage includes a plurality of correspondence tables corresponding to each of the plurality of document types, each correspondence table comprising:

a starting element that is an element in the document type;

at least one adjacent element that is a child element of the starting element; and at least one reachable element that is an element that is a descendant of the starting element.

9. The document database management system of claim 8, wherein the document type retriever further comprises a comparing unit that performs a node comparing process on the inputted query and the plurality of document types, and wherein the document retriever retrieves the at least one document type based on the result of the node comparing process.

10. The document database management system of claim 9, wherein the inputted query includes an inputted node and at least one neighbor node, and wherein the node comparing process includes:

identifying the correspondence tables whose starting element corresponds to the inputted node;

determining the correspondence tables from the identified correspondence tables that include the at least one neighbor node as either an adjacent node or a reachable node; and retrieving the document types of the determined correspondence tables.

11. The document database management system of claim 10, wherein the determining the correspondence tables further includes:

determining if the at least one neighbor node is an adjacent node in the identified correspondence tables when the neighbor node is a child node; and determining if the at least one neighbor node is a reachable node in the identified correspondence tables when the neighbor node is a descendant node.

12. A method for retrieving a document from a document database that stores a first number of a plurality of structured documents, comprising the steps of:

inputting a query that includes structural elements of a structured document and a relationship therebetween;

retrieving at least one document type, which defines structural elements of a structured document and a relationship therebetween, at least part of the structural elements and the relationship therebetween defined by the one document type matching the structural elements and the relationship therebetween included in the inputted query, wherein the retrieved at least one document type identifies a subset of a second number of prospective documents from the plurality of structured documents stored in the document database, the second number of prospective documents being less than the first number of documents; and retrieving a document satisfying the inputted query from the subset of prospective documents, each of the prospective documents being created according to the retrieved at least one document type.

13. The method for retrieving a document from a document database as set forth in claim 12, further comprising the steps of:

selecting a document type from the at least one retrieved document type;

retrieving a document satisfying the inputted query from the subset of prospective documents stored in the document database, each of the prospective documents being created according to the selected document type.

14. The method for retrieving a document from a document database as set forth in claim 12, wherein the at least one document type defines a super-subordinate relationship between structural elements, and the query includes a super-subordinate relationship between structural elements, the step for retrieving at least one document type comprises the substeps of:

checking whether each of the structural elements in the inputted query is associated with a structural element that descends from each of the structural elements by a corresponding relationship for the document type, the corresponding relationship being prepared in advance for the at least one document type and associating each of the structural elements in the at least one document type with a structural element that descends therefrom; and if every structural element in the query is associated with a structural element that descends therefrom by the corresponding relationship for the at least one document type, determining that at least part of the structural elements and the super-subordinate relationship therebetween defined by the document type matches the structural elements and the super-subordinate relationship included in the query.

15. The method of claim 14, wherein the at least one document type further comprises at least one correspondence table comprising:

a starting element;

at least one adjacent element that is a child element of the starting element; and at least one reachable element that is an element that is a descendant of the starting element.

16. The method of claim 15, wherein the step of retrieving at least one document type further comprises:

performing a node comparing process on the query and the at least one document type, and wherein the document retriever retrieves the at least one document type based on the result of the node comparing process.

17. The method of claim 16, wherein the query includes an inputted node and at least one neighbor node, and wherein the node comparing process includes:

determining if the at least one correspondence table includes the inputted node as a starting element;

determining if the at least one correspondence table includes the at least one neighbor node as either an adjacent node or a reachable node; and retrieving the document type when the correspondence table includes both the inputted node and the at least one neighbor node.

18. The method of claim 17, wherein the step of determining if the at least one correspondence table includes that at least one neighbor node further comprises:

determining if the at least one neighbor node is an adjacent node in the correspondence table when the neighbor node is a child node; and determining if the at least one neighbor node is a reachable node in the correspondence table when the neighbor node is a descendant node.

19. The method of claim 12, further comprising:

displaying the retrieved at least one document type; and selecting a document type from the displayed at least one document type.

* * * * *